US012466294B2

(12) United States Patent
Viguier

(10) Patent No.: US 12,466,294 B2
(45) Date of Patent: Nov. 11, 2025

(54) SLIDE RAIL FOR VEHICLE SEAT AND ASSEMBLY COMPRISING THE SLIDE RAIL

(71) Applicant: FAURECIA Sièges d'Automobile, Nanterre (FR)

(72) Inventor: Antoine Viguier, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 412 days.

(21) Appl. No.: 18/082,120

(22) Filed: Dec. 15, 2022

(65) Prior Publication Data

US 2023/0191957 A1 Jun. 22, 2023

(30) Foreign Application Priority Data

Dec. 17, 2021 (FR) ........................................ 2113866

(51) Int. Cl.
*B60N 2/07* (2006.01)

(52) U.S. Cl.
CPC .................................. *B60N 2/0705* (2013.01)

(58) Field of Classification Search
CPC .. B60N 2/0705; B60N 2/0715; B60N 2/0722; B60N 2/0727; B60N 2/07; B60N 2/08; B60N 2/0818; B60N 2/0868
USPC ................................ 296/65.13, 65.14, 65.15
See application file for complete search history.

(56) References Cited

U.S. PATENT DOCUMENTS 6,089,521 A * 7/2000 Tarusawa ............... B60N 2/085 296/65.14
9,701,219 B2 * 7/2017 Nagura ................ B60N 2/0875
10,059,230 B2 * 8/2018 Kume ...................... A47C 1/12
10,513,203 B2 * 12/2019 Ito .......................... B60N 2/067
10,889,209 B2 * 1/2021 Duriez ................. B60N 2/0881
12,012,016 B2 * 6/2024 Hao ...................... B60N 2/0705
2005/0145768 A1 * 7/2005 Rohee .................. B60N 2/0705 248/430
2010/0320353 A1 * 12/2010 Kojima ................... F16C 33/40 297/344.1
2015/0314707 A1 * 11/2015 Couasnon ............. B60N 2/085 297/344.1
2020/0331363 A1 10/2020 Dicicco

FOREIGN PATENT DOCUMENTS

FR 2863959 A1 6/2005
FR 3010009 A1 3/2015
FR 3028223 A1 5/2016
WO WO-03093053 A1 * 11/2003 ........... B60N 2/0705

* cited by examiner

*Primary Examiner* — Joseph D. Pape
*Assistant Examiner* — Veronica M Condo
(74) *Attorney, Agent, or Firm* — Barnes & Thornburg LLP

(57) ABSTRACT

A slide rail for a motor vehicle seat, comprises a first profile, a second profile and an interior space which extends in a longitudinal direction, the interior space extending between the first profile and the second profile, the second profile being movable relative to the first profile, rolling elements which are arranged in the interior space and configured to guide the movement of the second profile relative to the first profile in the longitudinal direction, and a runner which is arranged in the interior space and holds the second profile relative to the first profile in a support direction perpendicular to the longitudinal direction, wherein the runner is selectively connected to the first profile or to the second profile.

15 Claims, 5 Drawing Sheets

SLIDE RAIL FOR VEHICLE SEAT AND ASSEMBLY COMPRISING THE SLIDE RAIL

PRIORITY CLAIM

This application claims priority to French Patent Application No. FR2113866, field Dec. 17, 2021, which is expressly incorporated by reference herein.

BACKGROUND

The present disclosure relates to a slide rail for a motor vehicle seat and an assembly comprising such a slide rail.

SUMMARY

According to the present disclosure, a slide rail comprises a runner which is selectively connected to a first profile or a second profile in translation in the longitudinal direction.

In illustrative embodiments, the length in the elongation direction of the profile which is intended to be fixed to a motor vehicle floor is usually limited in order to avoid obstructing the floor. Therefore, in the first end position (or conversely in the second end position), part of the first profile extends beyond the second profile and/or part of the second profile extends beyond the first profile in the longitudinal direction.

In illustrative embodiments, the runner is not permanently fixed either to the first profile or to the second profile. Thus, the distance in the elongation direction over which the second profile is held relative to the first profile in the support direction is increased.

Consequently, the vibrations between the second profile and the first profile are reduced. In addition, the frequency of these vibrations is increased, which improves the perceived quality. Furthermore, the rotational movement in a transverse direction perpendicular to the longitudinal direction and to the support direction is reduced. Finally, the risk of contact between the second profile and the first profile is reduced.

In illustrative embodiments, the slide rail comprises a coupling device having a first state, in which the runner is connected to the first profile in translation in the longitudinal direction, and a second state, in which the runner is connected to the second profile in translation in the longitudinal direction, the coupling device is in the first state between an intermediate position and the first end position, and the coupling device is in the second state between the intermediate position and the second end position.

In illustrative embodiments, the first profile has a first stop, the second profile has a second stop, the runner is in contact with the first stop between the intermediate position and the first end position, and the runner is in contact with the second stop between the intermediate position and the second end position.

Thus, depending on the direction of movement in the longitudinal direction, in the intermediate position, the runner comes into contact with the first stop or the second stop so that it cannot be mechanically driven by the same profile on either side of the middle position. The reliability of the slide rail is thus increased.

In illustrative embodiments, one and/or more of the following arrangements may also be used:

- the coupling device comprises a coupling member which is supported by the runner and movable between a first coupling position and a second coupling position, the first profile has a first housing which is configured to receive the coupling member, the second profile has a second housing which is configured to receive the coupling member, the coupling member is received in the first housing and engages with the first profile in the first coupling position, and the coupling member is received in the second housing and engages with the second profile in the second coupling position;
- the runner has a passage which extends in a transverse direction perpendicular to the elongation direction and to the support direction, the coupling member is arranged in the passage, and the coupling device is configured to allow the coupling member to be moved in the passage between the first coupling position and the second coupling position when the second profile is in the intermediate position;
- the coupling member is pivotally mounted on the runner;
- the coupling member is resiliently connected to the runner;
- the coupling member consists of a ball;
- the coupling member comprises a ball;
- the coupling device comprises an axis for pivoting relative to the runner;
- the coupling member preferably has the shape of an angular sector;
- the coupling member is resiliently connected to the runner;
- the coupling member is molded in resiliently deformable material on the runner;
- the first contact surface has a first groove which extends in the longitudinal direction, and the second contact surface has a second groove which extends in the longitudinal direction;
- the slide rail comprises two of the runners, namely a front runner and a rear runner, the rolling elements being arranged between the front runner and the rear runner in the longitudinal direction;
- the rolling elements comprise lower rolling elements and upper rolling elements, the lower rolling elements and the upper rolling elements being arranged in the interior space and being configured to guide the movement of the second profile relative to the first profile in the longitudinal direction, and the runner has a first lower contact surface, a second lower contact surface, a first upper contact surface and a second upper contact surface, the first lower contact surface and the first upper contact surface extending next to the first profile, the second lower contact surface and the second upper contact surface extending next to the second profile, the runner holding the second profile relative to the first profile in the support direction in two opposite directions;
- the runner has, perpendicularly to the longitudinal direction, a shape which corresponds to the shape of the interior space.

The present disclosure further relates to an assembly comprising, in addition to the aforementioned slide rail, a motor vehicle seat. The first profile is intended to be fixed to a vehicle floor and the second profile is fixed to the seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows an assembly comprising a motor vehicle seat and two slide rails;

DETAILED DESCRIPTION

Figure 1:
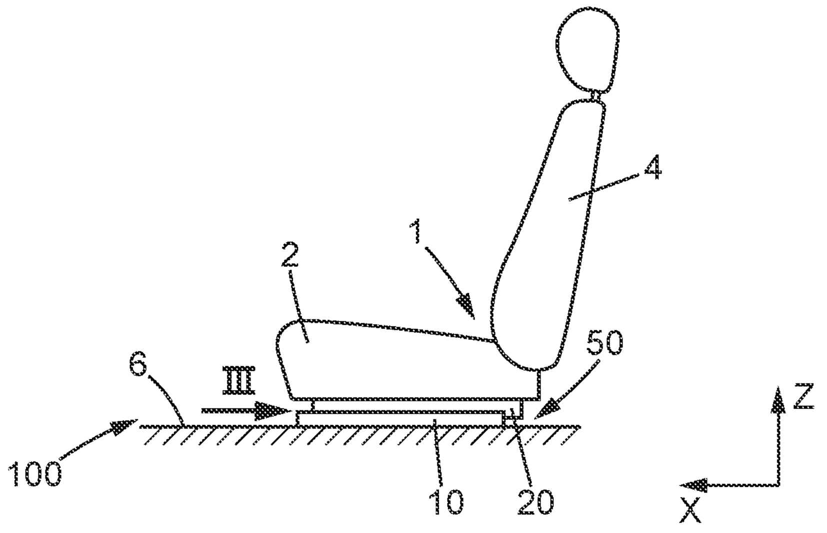
Figure 2:
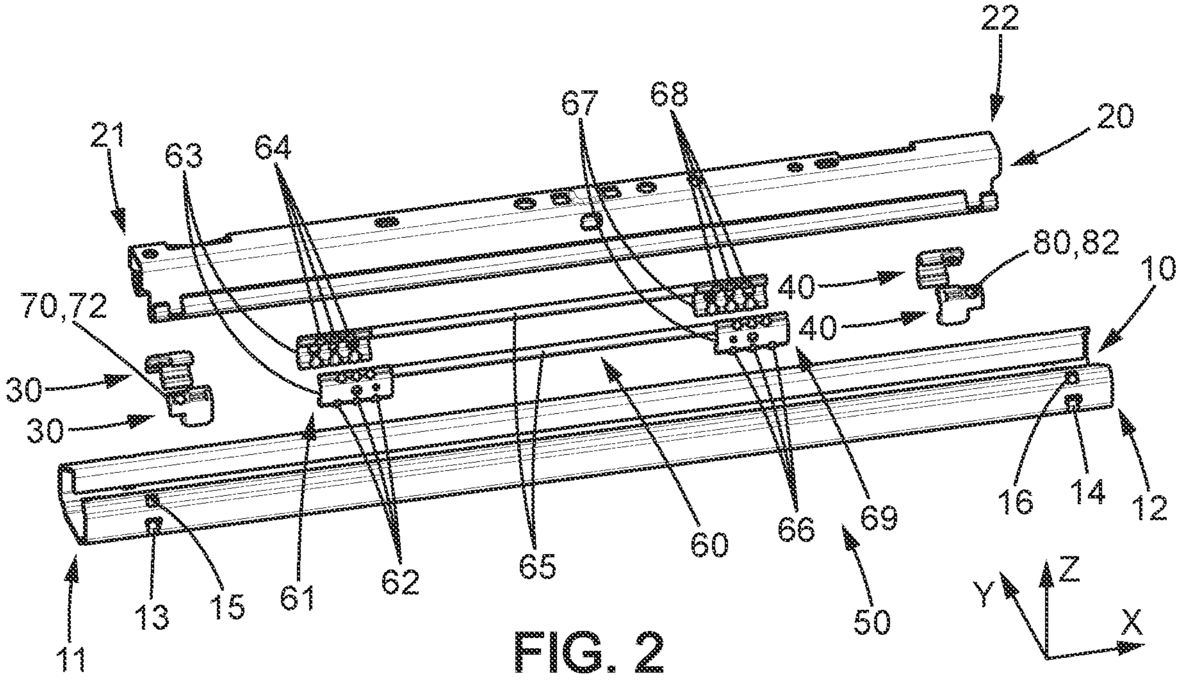
FIG. 2 shows a slide rail comprising runners in an exploded view.

FIG. 1 shows an assembly 100 which comprises a motor vehicle seat 1 and two slide rails 50 (only one slide rail 50 is visible in FIG. 1) which support the seat 1. The seat 1 comprises a seat cushion 2 and a backrest 4 which is mounted on the seat cushion.

The slide rails 50 extend in a longitudinal direction X. The slide rails 50 each comprise a first profile 10, a second profile 20, a rolling assembly 60, front runners 30, front coupling devices 70, rear runners 40 and rear coupling devices 80. The first profile 10 is fixed to a motor vehicle floor 6, for example by screwing. The seat 1 is fixed to the second profile 20, for example by bolting. Thus, the seat 1 is supported in a support direction Z which is perpendicular to the floor 6 by means of the slide rails 50. The support direction Z is perpendicular to the elongation direction X. Alternatively, the first profile 10 could be fixed to the seat 1 and the second profile 20 to the floor 6.

The first profile 10 and the second profile 20 are guided relative to one another in translation in the longitudinal direction X by means of the rolling assembly 60. The slide rails 50 are provided with a suitable locking device (not shown in the figures) which makes it possible to fix the second profile 20 relative to the first profile in the longitudinal direction X. A control unit (not shown) makes it possible to act on the locking device to release the second profile 20 relative to the first profile 10 and to allow the position of the seat 1 to be adjusted relative to the floor 6 of the vehicle by sliding in the longitudinal direction X.

As shown in FIGS. 2 to 5, the first profile 10 extends in the longitudinal direction X between a first front end 11 and a first rear end 12. The second profile 20 extends in the longitudinal direction X between a second front end 21 and a second rear end 22.

In the embodiment shown, the first profile 10 has a general U-shaped cross section which comprises a lower bottom 17 from which two first side walls extend upward, which walls are each formed by a first wing 18 lengthened by a first tab 19 which is oriented toward the inside of the U and directed toward the lower bottom 17.

The second profile 20 has an inverted general U-shaped cross section which comprises an upper bottom 27 from which two second side walls extend downward, which walls are each formed by a second wing 28 lengthened by a second tab 29 which is oriented toward the outside of the U and has a free end 29*a*. Each first tab 19 extends substantially vertically and in parallel with the second wings 28. The first tabs 19 are housed between the second wings 28 and the second tabs 29, while the second tabs 29 are housed between the first wings 18 and the first tabs 19.

Thus, the first wings 18, together with the second tab 29 which corresponds to them, delimit a left interior space 8*a* and a right interior space 8*b*.

In the embodiment shown, the first profile 10 and the second profile 20 have a plane of symmetry which extends perpendicularly to the transverse direction Y.

The rolling assembly 60 guides the movement of the second profile 20 relative to the first profile 10 in the longitudinal direction X and aims to counteract other relative movements between the second profile 20 and the first profile 10. The rolling assembly 60 extends into the left interior space 8*a* and into the right interior space 8*b* between a front rolling end 61 and a rear rolling end 69. In each of the left interior space 8*a* and right interior space 8*b*, the rolling assembly 60 comprises front lower rolling elements 62, a front frame 63, front upper rolling elements 64, a spacer 65, rear lower rolling elements 66, a rear frame 67 and rear upper rolling elements 68.

The front frame 63 maintains a constant space between the front lower rolling elements 62 and between the front upper rolling elements 64 in the longitudinal direction X. In addition, the front frame 63 holds the front lower rolling elements 62 relative to the front upper rolling elements 64 in the longitudinal direction X. The rear frame 67 maintains a constant space between the rear lower rolling elements 66 and between the rear upper rolling elements 68 in the longitudinal direction X. In addition, the rear frame 67 holds the rear lower rolling elements 66 relative to the rear upper rolling elements 68 in the longitudinal direction X. The spacer 65 connects the front frame 63 and the rear frame 67 so as to maintain a constant distance in the longitudinal direction X between the front lower rolling elements 62 and the front upper rolling elements 64 and between the rear lower rolling elements 66 and the rear upper rolling elements 68.

The front lower rolling elements 62 and the rear lower rolling elements 66 roll between the first profile 10 (more precisely the first wing 18 in the embodiment shown) and the second profile 20 (more precisely the second tab 29 in the embodiment shown) in order to counteract the movement of the second profile 20 relative to the first profile 10 in the support direction Z in a first direction Z1 directed toward the floor 6.

The front upper rolling elements 64 and the rear upper rolling elements 68 roll between the first profile 10 (more precisely the first wing 18 in the embodiment shown) and the second profile 20 (more precisely the second tab 29 in the embodiment shown) in order to counteract the movement of the second profile 20 relative to the first profile 10 in the support direction Z in a second direction Z2 opposite the first direction Z1.

The front runners 30 and the rear runners 40 complete the action of the rolling assembly 60 and are also arranged in the left interior space 8*a* and the right interior space 8*b*. In the left interior space 8*a* and the right interior space 8*b*, the rolling assembly 60 is arranged between the front runners 30 and the rear runners 40 in the longitudinal direction X.

More specifically, a front runner 30 and a rear runner 40 are housed in the left interior space 8*a*, while another front runner 30 and another rear runner 40 are housed in the right interior space 8*b*. Alternatively, the slide rail could only comprise a front runner 30 and/or a rear runner 40 in one of the left interior space 8*a* and the right interior space 8*b*.

The front runner 30 which is in the front left space 8*a* is the mirror image of the front runner 30 which is in the front right space 8*b*. In other words, the front runner 30 which is in the front left space 8*a* is symmetrical with respect to the plane of symmetry of the slide rail 30 of the front runner 30 which is in the front right space 8*b*.

Furthermore, the front runner 30 which is in the left interior space 8*a* is identical to the rear runner 40 which is in the right interior space 8*b*.

The front runners 30 have a first lower contact surface 32 which comes into contact with the first profile 10 (more precisely the first wing 18 in the embodiment shown) and a second lower contact surface 34 which comes into contact with the second profile 20 (more precisely the second tab 29 in the embodiment shown) in order to counteract the movement of the second profile 20 relative to the first profile 10 in the support direction Z in the first direction Z1.

The front runners 30 have a first upper contact surface 36 which comes into contact with the first profile 10 (more precisely the first wing 18 in the embodiment shown) and a second upper contact surface 38 which comes into contact with the second profile 20 (more precisely the second tab 29 in the embodiment shown) in order to counteract the movement of the second profile 20 relative to the first profile 10 in the support direction Z in the second direction Z2.

In addition, the first lower contact surface 32 has a first lower groove 31, the second lower contact surface 34 has a second lower groove 33, the first upper contact surface 36 has a first upper groove 35, and the second upper contact surface 38 has a second upper groove 37. The first lower groove 31, the second lower groove 33, the first upper groove 35 and the second upper groove 37 extend in the longitudinal direction X so as to allow the passage of lubricant, such as grease. Thus, the friction of the front runners 30 against the first profile 10 or the second profile 20 during sliding of the second profile 20 relative to the first profile 10 in the longitudinal direction X is reduced.

Similarly, the rear runners 40 have a first lower contact surface which comes into contact with the first profile 10 (more precisely the first wing 18 in the embodiment shown) and a second lower contact surface which comes into contact with the second profile 20 (more precisely the second tab 29 in the embodiment shown) in order to counteract the movement of the second profile 20 relative to the first profile 10 in the support direction Z in the first direction Z1.

And, the rear runners 40 have a first upper contact surface 36 which comes into contact with the first profile 10 (more precisely the first wing 18 in the embodiment shown) and a second upper contact surface 38 which comes into contact with the second profile 20 (more precisely the second tab 29 in the embodiment shown) in order to counteract the movement of the second profile 20 relative to the first profile 10 in the support direction Z in the second direction Z2.

The rear runners 40 also comprise a first lower groove, a second lower groove, a first upper groove and a second upper groove which extend in the longitudinal direction X.

The front runners 30 and the rear runners 40 each have a hook 90 which is intended to facilitate mounting of the slide rail 90. In order to hold the front runners 30 and the rear runners 40 on the second profile 20 before the first profile 10 and the second profile 20 are assembled, the hooks 90 engage with the free end 29*a* of the second tabs 29. The second tabs 29 supporting the front runners 30 and the rear runners 40 are then introduced between the first wings 18 and the first tabs 19. The front runners 30 and the rear runners 40 are then located in the left interior space 8*a* and the right interior space 8*b*, as described above.

The front coupling devices 70 make it possible to selectively connect the front runners 30 to the first profile 10 or to the second profile 20. The rear coupling device 80 makes it possible to selectively connect the rear runners 40 to the first profile 10 or to the second profile 20. The rear coupling device 80 is analogous to the front coupling device 70.

The front runners 30 each comprise a front passage 39 which extends in the transverse direction Y. A front coupling member 72 is arranged in the front passage 39. The front coupling member 72 can be received alternatively in a first front housing 15 which corresponds to a first state of the front coupling device 70 or in a second front housing 25 which corresponds to a second state of the front coupling device 70. The first front housing 15 is formed in the first profile 10 close to the first front end 11. The second front housing 25 is formed in the second profile 20 close to the second front end 21.

In the first state of the front coupling device 70, the front runner 30 is connected to (secured to) the first profile 10 by sliding in the longitudinal direction X. In the second state of the front coupling device 70, the front runner 30 is connected to (secured to) the second profile 20 by sliding in the longitudinal direction X.

Figure 3:
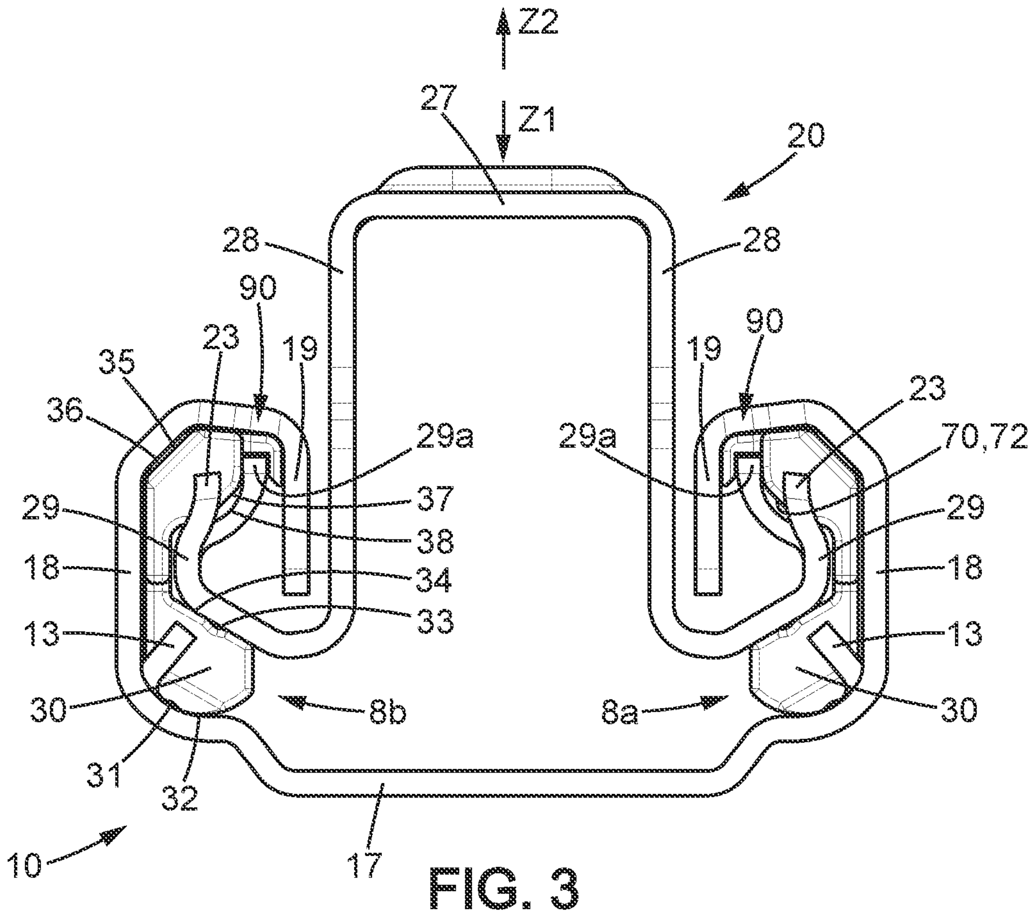
FIG. 3 shows the slide rail along the arrow marked III in FIG. 1.
Figure 4:
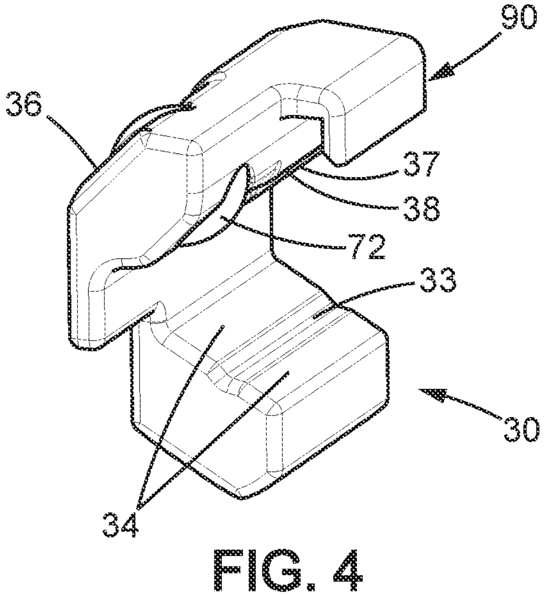
FIG. 4 shows a perspective view of a runner.
Figure 5:
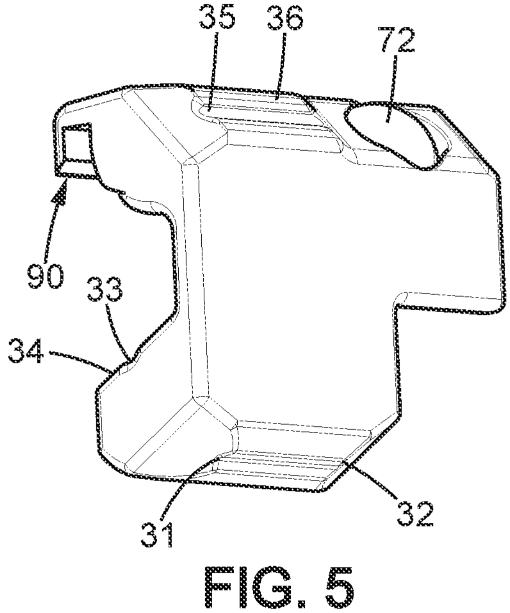
FIG. 5 shows a perspective view of the runner in a direction opposite that shown in FIG. 4.

The first profile 10 comprises a first front stop 13 which is intended to come into direct contact with the front runner 30 in order to limit the movement of the front runner 30 relative to the first profile 10 in the longitudinal direction toward the first front end 11. As shown in FIG. 3, the first front stop 13 is formed by a local deformation of the first wing 18. The second profile 20 comprises a second front stop 23 which is intended to come into direct contact with the front runner 30 in order to limit the movement of the front runner 30 relative to the second profile 20 in the longitudinal direction X toward the second front end 21. As shown in FIG. 3, the second front stop 23 is formed by a local deformation of the second tab 29.

The rear runners 40 each comprise a rear passage which extends in the transverse direction Y. A rear coupling member 82 is arranged in the rear passage. The rear coupling member 82 can be received alternatively in a first rear housing 16 which corresponds to a first state of the rear coupling device 80 or in a second rear housing 26 which corresponds to a second state of the rear coupling device 80. The first rear housing 16 is formed in the first profile 10 close to the first rear end 12. The second rear housing 26 is formed in the second profile 20 close to the second rear end 22.

In the first state of the rear coupling device 80, the rear runner 40 is connected to the first profile 10 by sliding in the longitudinal direction X. In the second state of the rear coupling device 80, the rear runner 40 is connected to the second profile 20 by sliding in the longitudinal direction X.

The first profile 10 comprises a first rear stop 14 which is intended to come into direct contact with the rear runner 40 in order to limit the movement of the rear runner 40 relative to the first profile 10 in the longitudinal direction toward the first rear end 12. The first rear stop 14 is formed by a local deformation of the first wing 18. The second profile 20 comprises a second rear stop 24 which is intended to come into direct contact with the rear runner 40 in order to limit the movement of the rear runner 40 relative to the second profile 20 in the longitudinal direction X toward the second rear end 22. The second rear stop 24 is formed by a local deformation of the second tab 29.

Figure 6:
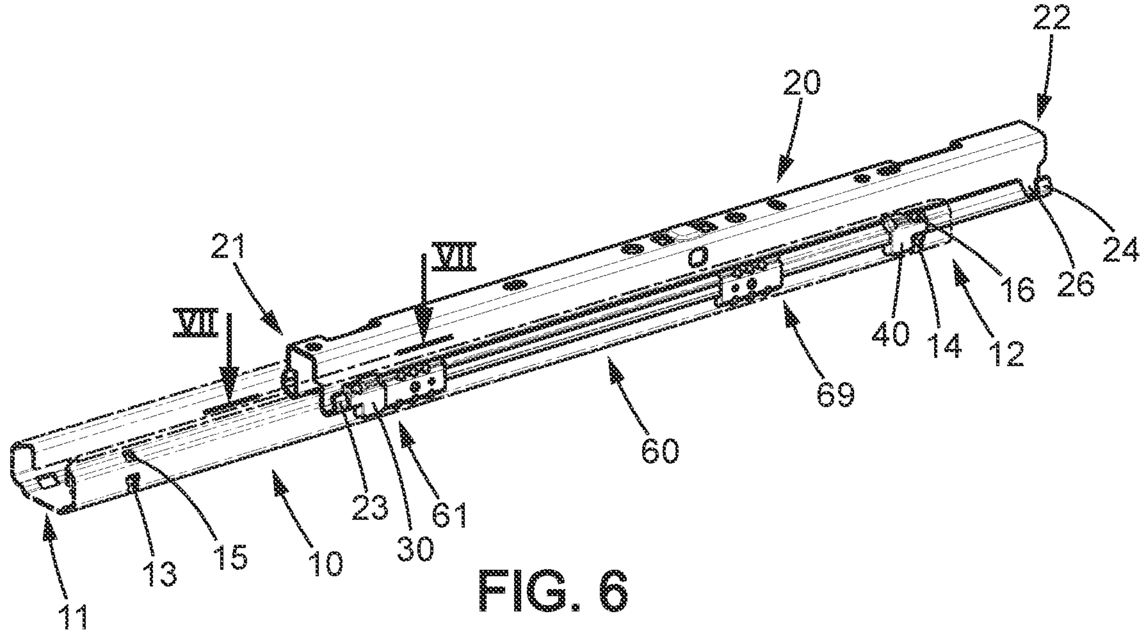
FIG. 6 shows the slide rail in perspective in a rear end position.
Figure 7:
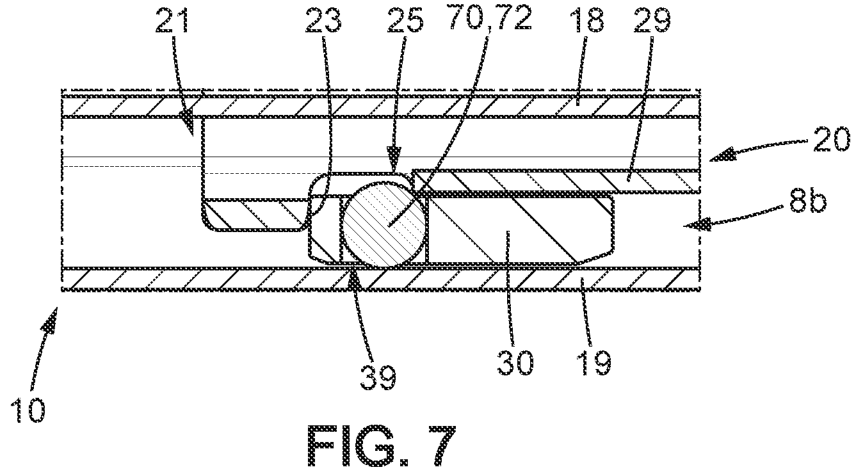
FIG. 7 shows a partial sectional view of the slide rail along the line marked VII-VII in FIG. 6 in the rear end position.

In the rear end position of the second profile 20 relative to the first profile (of the seat 1 relative to the floor 6) shown in FIGS. 6 and 7, the first front end 11 projects beyond the second front end 21. Accordingly, the front coupling device 70 is in the second state. The second rear end 22 projects beyond the first rear end 12. Accordingly, the second coupling device 80 is in the first state.

The front runners 30 are in contact with the second stop 23 and the front coupling member 72 is engaged in the second front housing 25 so that the front coupling member 72 engages with the second front housing 25. The front runners 30 are connected to the second profile 20 and held close to the second front end 21.

The rear runners 40 are in contact with the first rear stop 14 and the rear coupling member 82 is engaged in the first rear housing 16 so that the rear coupling member 82 engages with the first rear housing 16. The rear runners 40 are connected to the first profile 10 and held close to the first rear end 12.

When the second profile 20 moves relative to the first profile 10 in the longitudinal direction X in a first forward direction X1, the slide rail 50 arrives in a second intermediate position (not shown) in which the second rear stop 24 comes into contact with the rear runner 40 and the rear passage is located next to the second rear housing 26. The second rear end 22 is then substantially at the same level as the first rear end 12, while the first front end 11 still projects beyond the second front end 21 in the elongation direction X. Consequently, the second rear stop 24 pushes on the rear runner 40 in the first direction X1, which causes the rear coupling member 82 to be moved out of the first rear housing 16 by translation in the rear passage in the transverse direction Y. The rear coupling member 82 then enters the second rear housing 26. The rear runners 40 are then connected to the second profile 20 and held close to the second rear end 22, while the front runners 30 are still connected to the second profile 20 and held close to the second front end 21.

Figure 8:
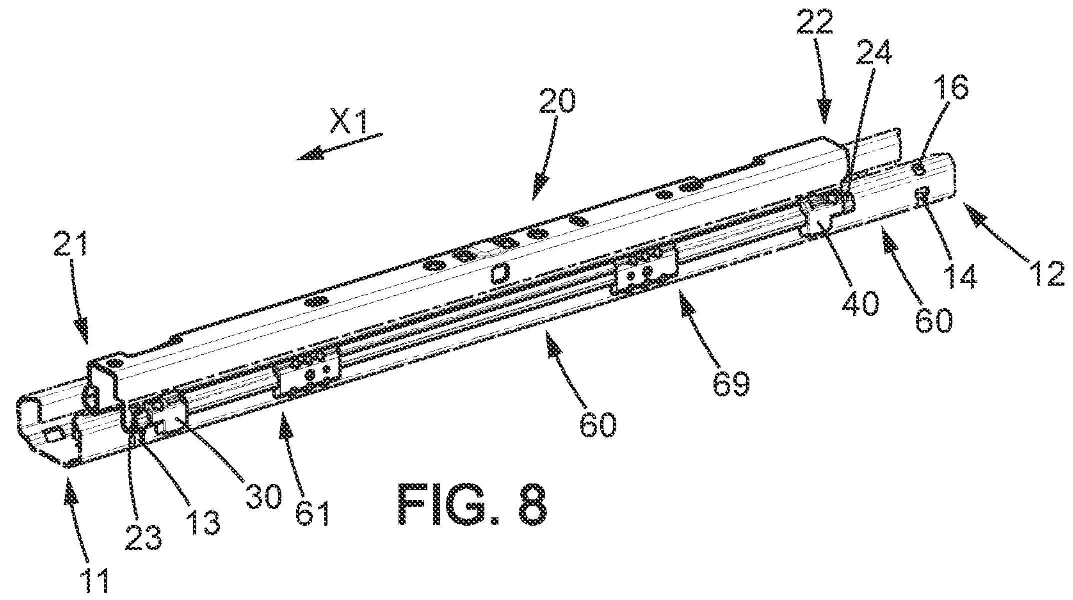
FIG. 8 shows the slide rail in perspective in a first intermediate position.
Figure 9:
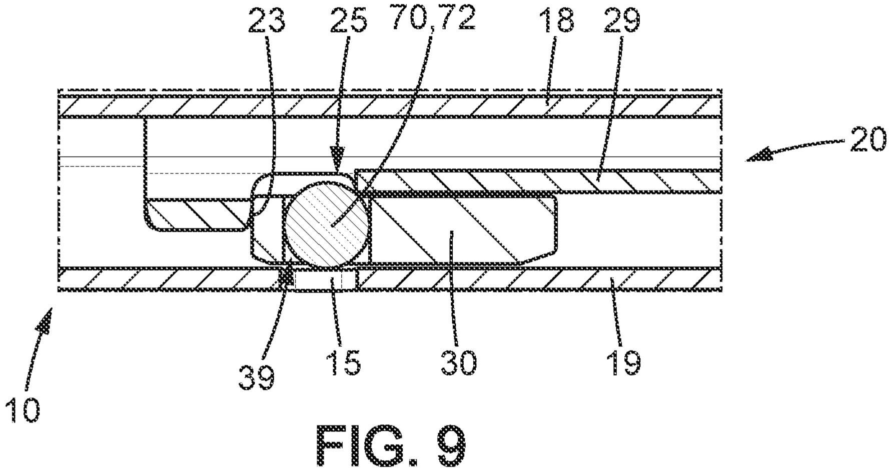
FIG. 9 shows a partial sectional view of the slide rail along the line VII-VII in the first intermediate position.

When the second profile 20 continues its movement relative to the first profile 10 in the longitudinal direction X in the first direction X1, the slide rail 50 then arrives in a first intermediate position (shown in FIGS. 8 and 9) in which the front runners 30 come into contact with the first front stop 13. The second front end 21 is then substantially at the same level as the first front end 11, while the first rear end 12 still projects beyond the second rear end 22 in the elongation direction X. The front passage 39 is located next to the first front housing 15. Consequently, the edge of the second front housing 25 pushes on the front coupling member 72 in the first direction X1, which causes the front coupling member 72 to be moved out of the second front housing 25 by translation in the front passage 39 in the transverse direction Y. The front coupling member 72 then enters the first front housing 15. The front runners 30 are then connected to the first profile 10 and held close to the first front end 11, while the rear runners 40 are still connected to the second profile 20 and held close to the second rear end 22.

Figure 10:
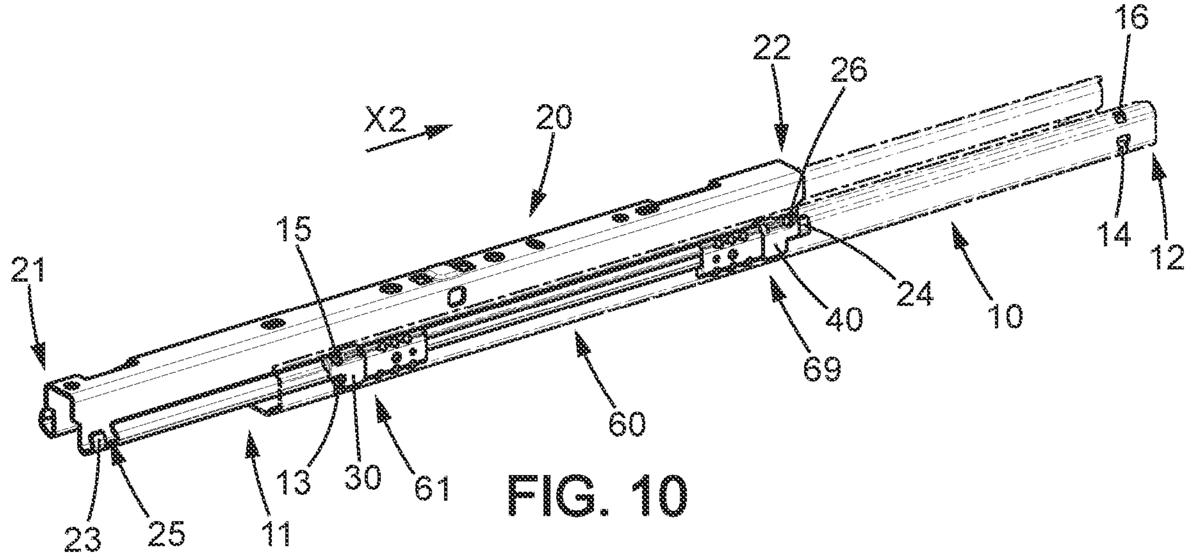
FIG. 10 shows the slide rail in perspective in a front end position.
Figure 11:
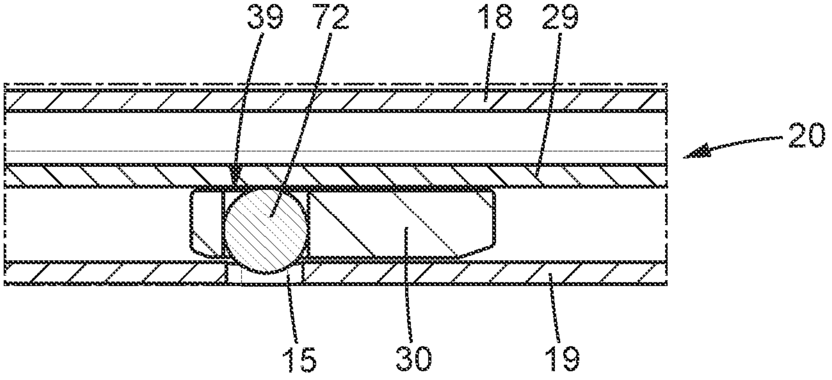
FIG. 11 shows a partial sectional view of the slide rail along the line VII-VII in the front end position.

When the second profile 20 continues its movement relative to the first profile 10 in the longitudinal direction X in the first direction X1, the slide rail 50 arrives in the front end position (shown in FIGS. 10 and 11), the front rolling end 61 comes into contact with the front runners 30 and the rear runners 40 come into contact with the rear rolling end 69.

The second front end 21 projects beyond the first front end 11. The front coupling device 70 is in the first state. The first rear end 12 projects beyond the second rear end 22. The rear coupling device 80 is in the second state.

When the second profile 20 moves relative to the first profile 10 in the longitudinal direction X from the front end position in a second direction X2 backward and opposite the first direction X1, the slide rail 50 arrives in the first intermediate position. The front passage 39 is located opposite the second front housing 25 and the second front stop 23 pushes on the front runner 30 in the second direction X2, which causes the front coupling member 72 to be moved out of the first front housing 15 by translation in the front passage 39 in the transverse direction Y. The front coupling member 72 then enters the second front housing 25. The front runners 30 are then connected to the second profile 20 and held close to the second front end 21, while the rear runners 40 are still connected to the second profile 20 and held close to the second rear end 22.

When the second profile 20 continues its movement relative to the first profile 10 in the longitudinal direction X from the first intermediate position in the second direction X2, the slide rail 50 arrives in the second intermediate position. The rear passage is located opposite the first rear housing 16 and the first rear stop 14 pushes on the rear runner 40 in the first direction X1, which causes the rear coupling member 82 to be moved out of the second rear housing 26 by translation in the rear passage in the transverse direction Y. The rear coupling member 82 then enters the first rear housing 14. The rear runners 40 are then connected to the first profile 10 and held close to the first rear end 12, while the front runners 30 are still connected to the second profile 20 and held close to the second front end 21.

When the second profile 20 continues its movement relative to the first profile 10 in the longitudinal direction X in the second direction X2, the slide rail 50 arrives in the rear end position (shown in FIGS. 6 and 7), the front runners 30 come into contact with the front rolling end 61, while the rear runners 40 remain distant from the rear rolling end 69.

Schematically, the front coupling device 70 connects the front runner 30 with the profile of which the front end is set back in the first direction X1 and the rear coupling device 80 connects the rear runner 80 with the profile which protrudes the least in the second direction X2.

In the embodiment shown in FIGS. 1 to 11, the first front coupling member 72 and the second rear coupling member 82 have a circular cross section, such as a ball or a roller, in order to allow their movement by rolling in the front passage 39 and in the rear passage 49, respectively.

Figure 12:
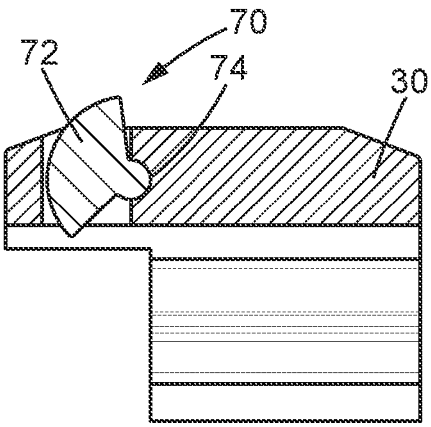
FIG. 12 shows a perspective view of an alternative runner.

FIG. 12 shows an alternative embodiment of the slide rail shown in FIGS. 1 to 11. The front coupling device 70 comprises a front coupling member 72 and an axis 74 for pivoting relative to the front runner 30, the pivot axis 74 extending perpendicularly to the longitudinal direction (in a plane containing the transverse direction Y and the support direction Z), preferably at 45 degrees with respect to the transverse direction Y and at 45 degrees with respect to the support direction Z, and the front coupling member 72 in particular has the shape of an angular sector.

According to another alternative embodiment, the front coupling member 72 could be resiliently connected to the front runner 30, and in particular molded on the front runner 30 in a resiliently deformable material. The resilient connection between the front coupling member 72 and the front runner 30 can in particular be applied to the alternative embodiment shown in FIG. 12, with the pivot axis 74 then being advantageously fixed at one end to the front runner 30 and at the other end to the front coupling member 72, the pivot axis 74 deforming (twisting) in order to allow the front coupling member 72 to be moved between the first state and the second state. The resilient connection between the front coupling member 72 and the front runner 30 can also be applied to the exemplary embodiment shown in FIGS. 1 to 11 or to different embodiments.

For the alternative embodiment shown in FIG. 12, as for the other alternative embodiments mentioned, the rear runners 40 preferably have the same feature modifications with respect to the exemplary embodiment shown in FIGS. 1 to 11 as those mentioned with reference to the front runners 30, since the rear runners are preferably analogous to the front runners, as indicated above.

Of course, the disclosure is in no way limited to the embodiment(s) described by way of non-limiting illustration. Thus, even if this is not preferred, it could be possible to place a front runner 30 and/or a rear runner 40 only in the left interior space 8*a* or the right interior space 8*b*.

In particular, if the second rear end 22 never protrudes in the second direction X2 relative to the first rear end 12, the rear runner 40 can be held fixed to the second profile 20 close to the second rear end 22.

The present disclosure relates more particularly to a slide rail, comprising:

a first profile, a second profile and an interior space which extends in a longitudinal direction, the interior space extending between the first profile and the second profile, the second profile being movable relative to the first profile in the longitudinal direction in a first direction as far as a first end position and in a second direction as far as a second end position, and rolling elements which are arranged in the interior space and configured to guide the movement of the second profile relative to the first profile in the longitudinal direction.

A comparative slide may be provided with a comparative locking device, making it possible to adjust a relative position of the second profile relative to the first profile in the longitudinal direction and to hold this relative position.

In the event of strong stresses applied to the slide rails, in particular in the event of a violent impact forward or backward, the rolling elements which are placed between the first profile and the second profile provide resistance to tearing and crushing of the slide.

In order to strengthen the resistance of the slide rail, comparative slide rails may include a runner which is arranged in the interior space and holds the second profile relative to the first profile in a support direction perpendicular to the longitudinal direction, the runner having a first contact surface extending next to the first profile and a second contact surface extending next to the second profile.

However, the present disclosure aims to improve the stability of the upper profile and thus improve the perceived quality of the slide rail as compared to the comparative slide.

Thus, in accordance with the present disclosure, the runner is selectively connected to the first profile or the second profile in translation in the longitudinal direction.

The length in the elongation direction of the profile which is intended to be fixed to a motor vehicle floor is usually limited in order to avoid obstructing the floor. Therefore, in the first end position (or conversely in the second end position), part of the first profile extends beyond the second profile and/or part of the second profile extends beyond the first profile in the longitudinal direction.

If the comparative runner is fixed on the second profile in the first end position (or conversely in the second end position), either the comparative runner is no longer between the first profile and the second profile so that it is no longer operational, or the comparative runner should be moved away from the ends of the second profile so that its effectiveness is reduced, or the length of the comparative runner over which the rolling elements are arranged will need to be reduced. This disadvantage is all the more complicated to overcome as the rolling elements move both relative to the first profile and relative to the second profile in the longitudinal direction during the relative movement between the second profile and the first profile.

The present disclosure makes it possible to minimize this disadvantage since the runner is no longer permanently fixed either to the first profile or to the second profile. Thus, the distance in the elongation direction over which the second profile is held relative to the first profile in the support direction is increased.

Consequently, the vibrations between the second profile and the first profile are reduced. In addition, the frequency of these vibrations is increased, which improves the perceived quality. Furthermore, the rotational movement in a transverse direction perpendicular to the longitudinal direction and to the support direction is reduced. Finally, the risk of contact between the second profile and the first profile is reduced.

According to another feature in accordance with the disclosure, the slide rail preferably comprises a coupling device having a first state, in which the runner is connected to the first profile in translation in the longitudinal direction, and a second state, in which the runner is connected to the second profile in translation in the longitudinal direction, the coupling device is in the first state between an intermediate position and the first end position, and the coupling device is in the second state between the intermediate position and the second end position.

According to an additional feature in accordance with the present disclosure, the first profile preferably has a first stop, the second profile has a second stop, the runner is in contact with the first stop between the intermediate position and the first end position, and the runner is in contact with the second stop between the intermediate position and the second end position.

Thus, depending on the direction of movement in the longitudinal direction, in the intermediate position, the runner comes into contact with the first stop or the second stop so that it cannot be mechanically driven by the same profile on either side of the middle position. The reliability of the slide rail is thus increased.

In various embodiments of the slide rail according to the disclosure, one and/or more of the following arrangements may also be used:

the coupling device comprises a coupling member which is supported by the runner and movable between a first coupling position and a second coupling position, the first profile has a first housing which is configured to receive the coupling member, the second profile has a second housing which is configured to receive the coupling member, the coupling member is received in the first housing and engages with the first profile in the first coupling position, and the coupling member is received in the second housing and engages with the second profile in the second coupling position;

the runner has a passage which extends in a transverse direction perpendicular to the elongation direction and to the support direction, the coupling member is arranged in the passage, and the coupling device is configured to allow the coupling member to be moved in the passage between the first coupling position and the second coupling position when the second profile is in the intermediate position;

the coupling member is pivotally mounted on the runner;

the coupling member is resiliently connected to the runner;

the coupling member consists of a ball;

the coupling member comprises a ball;

the coupling device comprises an axis for pivoting relative to the runner;

the coupling member preferably has the shape of an angular sector;

the coupling member is resiliently connected to the runner;

the coupling member is molded in resiliently deformable material on the runner;

the first contact surface has a first groove which extends in the longitudinal direction, and the second contact surface has a second groove which extends in the longitudinal direction;

the slide rail comprises two of the runners, namely a front runner and a rear runner, the rolling elements being arranged between the front runner and the rear runner in the longitudinal direction;

the rolling elements comprise lower rolling elements and upper rolling elements, the lower rolling elements and the upper rolling elements being arranged in the interior space and being configured to guide the movement of the second profile relative to the first profile in the longitudinal direction, and the runner has a first lower contact surface, a second lower contact surface, a first upper contact surface and a second upper contact surface, the first lower contact surface and the first upper contact surface extending next to the first profile, the second lower contact surface and the second upper contact surface extending next to the second profile, the runner holding the second profile relative to the first profile in the support direction in two opposite directions;

the runner has, perpendicularly to the longitudinal direction, a shape which corresponds to the shape of the interior space.

The present disclosure further relates to an assembly comprising, in addition to the aforementioned slide rail, a motor vehicle seat. The first profile is intended to be fixed to a vehicle floor and the second profile is fixed to the seat.

The invention claimed is:

1. A slide rail for a motor vehicle seat, the slide rail comprising:

a first profile, a second profile and an interior space which extends in a longitudinal direction, the interior space extending between the first profile and the second profile, the second profile being movable relative to the first profile in the longitudinal direction in a first direction as far as a first end position and in a second direction as far as a second end position, rolling elements which are arranged in the interior space and configured to guide the movement of the second profile relative to the first profile in the longitudinal direction, and a runner which is arranged in the interior space and holds the second profile relative to the first profile in a support direction perpendicular to the longitudinal direction, the runner having a first contact surface extending next to the first profile and a second contact surface extending next to the second profile, wherein the runner is selectively connected to the first profile or the second profile in translation in the longitudinal direction, the slide rail comprises a coupling device having a first state, in which the runner is connected to the first profile in translation in the longitudinal direction, and a second state, in which the runner is connected to the second profile in translation in the longitudinal direction, the coupling device is in the first state between an intermediate position and the first end position, and the coupling device is in the second state between the intermediate position and the second end position.

2. The slide rail of claim 1, wherein the first profile has a first stop, the second profile has a second stop, the runner is in contact with the first stop between the intermediate position and the first end position, and the runner is in contact with the second stop between the intermediate position and the second end position.

3. The slide rail of claim 1, wherein the coupling device comprises a coupling member which is supported by the runner and movable between a first coupling position and a second coupling position, the first profile has a first housing which is configured to receive the coupling member, the second profile has a second housing which is configured to receive the coupling member, in the first coupling position, the coupling member is received in the first housing and engages with the first profile, and in the second coupling position, the coupling member is received in the second housing and engages with the second profile.

4. The slide rail of claim 3, wherein the runner has a passage which extends in a transverse direction perpendicular to the longitudinal direction and to the support direction, the coupling member is arranged in the passage, and the coupling device is configured to allow the coupling member to be moved in the passage between the first coupling position and the second coupling position when the second profile is in the intermediate position.

5. The slide rail of claim 3, wherein the coupling member consists of a ball.

6. The slide rail of claim 3, wherein the coupling device comprises an axis for pivoting relative to the runner.

7. The slide rail of claim 6, wherein the coupling member has the shape of an angular sector.

8. The slide rail of claim 3, wherein the coupling member is resiliently connected to the runner.

9. The slide rail of claim 8, wherein the coupling member is molded in resiliently deformable material on the runner.

10. The slide rail of claim 1, wherein: the first contact surface has a first groove which extends in the longitudinal direction, and the second contact surface has a second groove which extends in the longitudinal direction.

11. The slide rail of claim 1, wherein the slide rail comprises two of the runners, namely a front runner and a rear runner, the rolling elements being arranged between the front runner and the rear runner.

12. The slide rail of claim 1, wherein the rolling elements comprise lower rolling elements and upper rolling elements, the lower rolling elements and the upper rolling elements being arranged in the interior space and being configured to guide the movement of the second profile relative to the first profile in the longitudinal direction, and the runner has a first lower contact surface, a second lower contact surface, a first upper contact surface and a second upper contact surface, the first lower contact surface and the first upper contact surface extending next to the first profile, the second lower contact surface and the second upper contact surface extending next to the second profile, the runner holding the second profile relative to the first profile in the support direction in two opposite directions.

13. The slide rail of claim 1, wherein the runner has, perpendicularly to the longitudinal direction, a shape which corresponds to the shape of the interior space.

14. An assembly comprising a motor vehicle seat and at least one slide rail according to claim 1, wherein the first profile is adapted to be fixed to a vehicle floor and the second profile is fixed to the seat.

15. The slide rail of claim 3, wherein the coupling member comprises a ball.

* * * * *